Jan. 5, 1932.  S. EVANS  1,839,384
FEEDING DEVICE FOR WELDING MACHINES
Filed Dec. 4, 1928  2 Sheets-Sheet 1

Seth Evans INVENTOR
BY Jesse R. Stone
ATTORNEY

Jan. 5, 1932.  S. EVANS  1,839,384
FEEDING DEVICE FOR WELDING MACHINES
Filed Dec. 4, 1928  2 Sheets-Sheet 2
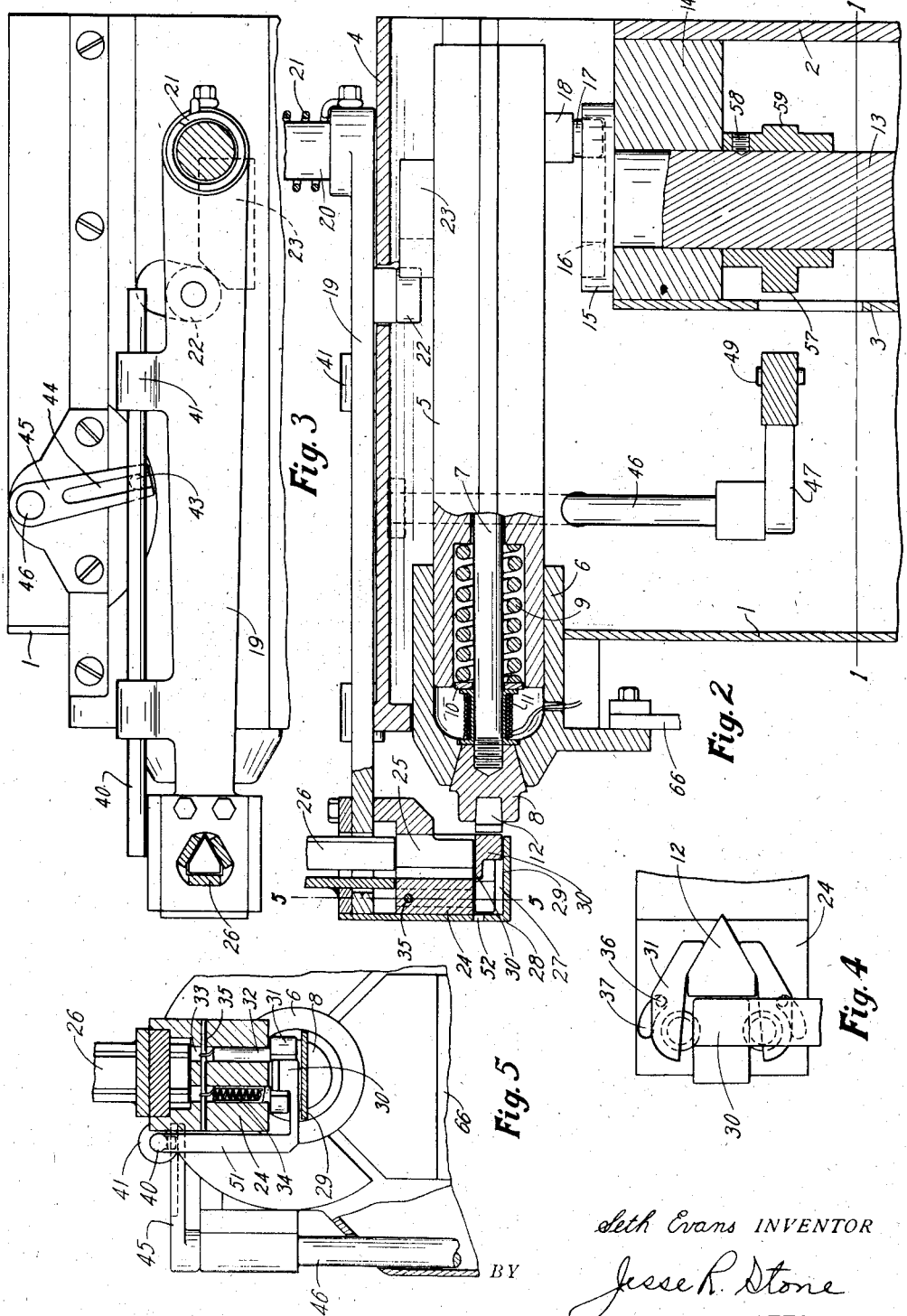
Seth Evans INVENTOR
BY Jesse R. Stone
ATTORNEY Patented Jan. 5, 1932

1,839,384

UNITED STATES PATENT OFFICE

SETH EVANS, OF HOUSTON, TEXAS, ASSIGNOR TO HUGHES TOOL COMPANY, OF HOUSTON, TEXAS, A CORPORATION OF TEXAS

FEEDING DEVICE FOR WELDING MACHINES

Application filed December 4, 1928. Serial No. 323,737.

My invention relates to feeding devices employed in moving cutter teeth or similar parts into position upon a welding terminal where they may be advanced into position for welding upon the work.

The device is adapted for use where a series of teeth are to be fed from a magazine to a welding electrode for rapid operations of electrically welding the teeth in position.

An object of the invention is to provide an effective means of receiving the teeth from a magazine and then moving them into firm position in the welding terminal so that the teeth may form part of the electrode when the same is advanced toward the blank to which the teeth are to be welded.

The invention lies in the particular construction and arrangement of the parts whereby the feeding of the teeth to welding position is made accurate and positive, so that no failure of the machine in use will be experienced.

Further objects and advantages will be noted from the detailed description which follows when taken in connection with the drawings herewith wherein:

Fig. 2 is a vertical section of the device taken longitudinally thereof.

Fig. 3 is a broken detail in top plan view of the device, the magazine being shown in section.

Fig. 4 is a bottom plan view of the tooth feeder.

Fig. 5 is a broken front view on the plane 5—5 of Fig. 2.

Figure 1:
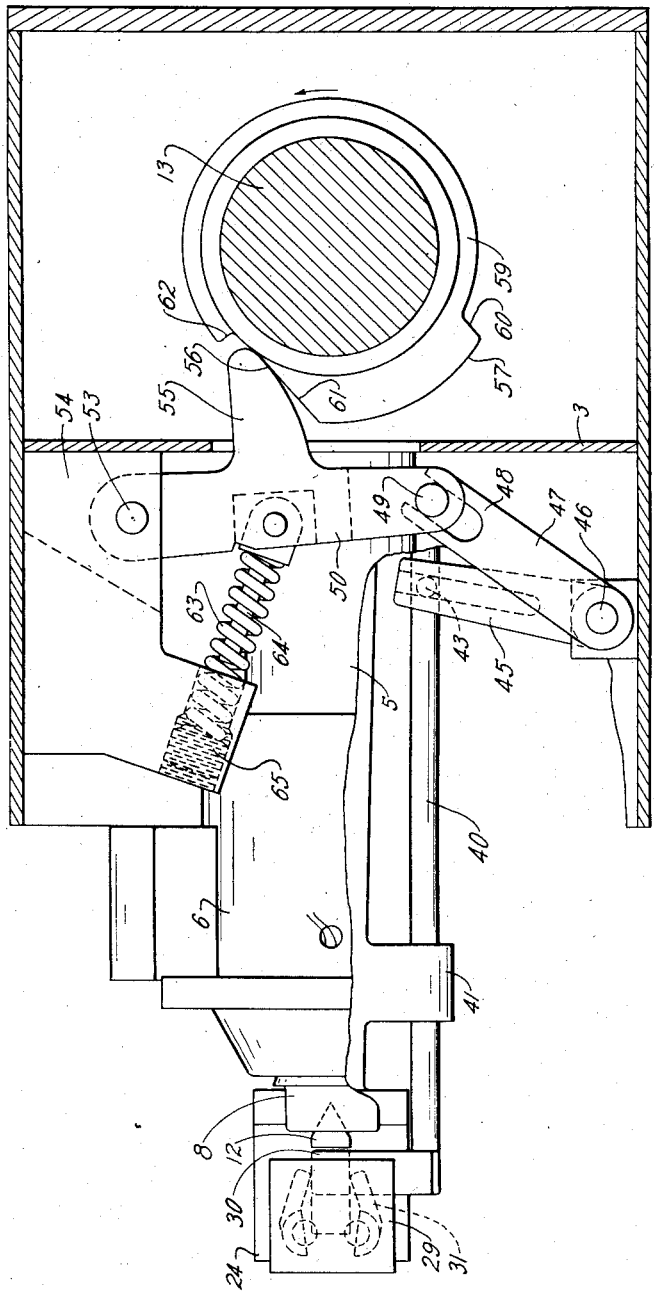
Fig. 1 is a bottom plan view of the welder taken on the plane 1—1 of Fig. 2.

The feeding mechanism which forms the subject of my present invention is shown in connection with the welding mechanism with which it is used, the two forming a unitary structure. I have shown the mechanism as mounted upon a supporting housing including a forward plate 1, a rearward plate 2, an intermediate plate 3 and a top plate 4.

A welding mandrel is slidable horizontally adjacent the upper end of the frame. It comprises a cylindrical sleeve 5, the forward end of which fits within a head 6. A rod 7 in said sleeve projects forwardly into said head and has a tooth holding chuck 8 at its forward end within said head. Said chuck, which is preferably of copper, is detachable from said rod so that it may be replaced when worn. A spring 9 on said rod bears at its rearward end upon a shoulder on said sleeve 5 and at its forward end it bears against a washer 10 upon said rod, tending to hold said rod and head 6 resiliently forward.

I may place a small solenoid or electromagnet 11 about the rod 7 adjacent the inner side of the chuck 8 to act as a magnet to hold the steel teeth 12 in position within a forward recess formed in the chuck to receive said teeth.

The mandrel 5 is moved forwardly toward the work—not shown—by means of a shaft 13 set in upright position between the plates 1 and 3 and having a bearing in a block 14 between said plates. The upper end of said shaft has a head 15 thereon, the upper face of which has a cam groove 16 therein to receive a roller 17 upon a pin 18 projecting downwardly from said mandrel. Thus when said shaft 13 is rotated a reciprocating motion is given to the mandrel 5 and rod 7.

The feeding mechanism includes a flat plate or arm 19 mounted upon a pin 20 on the rearward end of the plate 4. A spring 21 on said pin holds said arm toward its position in Fig. 3 with a roller 22 on its lower side bearing against a cam block 23 on the upper side of the mandrel 5.

The forward end of the arm 19 projects slightly beyond the chuck 8 and has a tooth engaging head thereon. Said head includes a block 24 which is secured firmly to the forward end of said arm and which has a passage 25 extending vertically through said block to register with the lower end 26 of a three-sided chute through which the teeth 12 will feed downwardly into the passage 25 of the block. It is to be understood that the chute 26 from the magazine is pivoted in such manner as to swing with the arm and that teeth may thus be fed continuously by gravity through the chute 26 into the passage 25 in the block. The passage 25 leads through said block to a small chamber 27 immediately below the block. This chamber is formed by a plate 28 fitting against the forward side of the block 24 and having a lower end bent laterally in spaced relation below the block 24, as shown at 29, to form a slide-way for a finger 30, which will be later described.

On the lower side of the block 24, and held against the lower face of the block, are two arms 31, shown best in Fig. 4, said figure being a bottom plan view of the block 24 with the plate 28 removed. The two arms 31 are secured to upwardly extending posts 32 fitting within cylindrical recesses 33 in the said block. Springs, shown at 34 in Fig. 5, are fitted within central recesses in said posts 32 and are connected with the posts at one end and to a cross pin 35 at the upper end so as to exert a tension on said fingers 31 tending to hold them inwardly against the tapered face of the tooth 12, as shown in Fig. 4. There are upwardly extending dowel pins 36 on the tooth-engaging arms 31 which fit within arcuate slots 37, tending to steady and guide the said arms and limit their inward movement. As will be noted the two arms 31 are arranged one on each side of the passage 25, through which the tooth is fed between the arms, and by which it is held until moved into position within the chuck 8 by the finger 30.

Said finger 30 is shown in Figs. 4 and 5. It is secured at the forward end of a cylindrical shaft or rod 40. Said rod, as shown in Fig. 3, is secured within bearing sleeves 41 extending laterally from the arm 19. The shaft is slidable longitudinally in said bearing sleeves and has a downwardly extending pin 43 thereon which is adapted to fit within a slot 44 in the grooved forward end of an arm 45. Said arm 45 is mounted in the upper end of a shaft 46, which, as seen in Fig. 2, extends downwardly into the supporting housing below the mandrel and connects at its lower end with an arm 47 similar to the arm 45. This construction is shown best in Fig. 1. The arm 47 extends radially from the shaft 46 and has a forked forward end 48 which straddles a post 49 upon an operating lever 50.

The forward end of the shaft 40 has a downwardly extending arm 51 (see Fig. 5) which lies along the side of the block 24, and at a point opposite the chamber 27, is extended at right angles; and at a point centrally below said block it has a finger 30 mounted thereon, as previously set forth. The said finger 30 has a guide member 30' thereon which, when the finger is moved outwardly away from the position adjacent the chuck 8, as seen in Fig. 2, will enter guide opening 52 in the plate 28 and in this position the teeth 12 may drop downwardly from the passage 25 into position in front of the feeding finger 30 so that they may be advanced by the movement of said finger into a receiving recess in the chuck 8.

The shaft 40 with the arm and feeding finger thereon is moved relative to the main supporting arm 19 by the arm 45 previously described. This movement of the arm and shaft is accomplished through the lever 50, shown in Fig. 1. Said lever 50 is pivoted upon a pin 53 mounted upon a bracket 54 in the housing. This arm has a laterally extending finger 55 thereon which is rounded at its forward end 56 to bear against a rotatable cam member 57. Said cam member comprises a collar fixed upon the shaft 13 by means of a set screw 58, as shown in Fig. 2. The collar has a raised cam member 59 thereon which is concentric with the shaft for a portion of the distance about the same and this cam member is enlarged at 57 to provide a shoulder 60 on the advancing side and an inclined sloping shoulder 61 on the receding side. The shoulder 61 is approximately tangent to the cam sleeve and a radial shoulder 62 is formed at the end of the inclined portion 61 of said cam. The finger 55 is held in contact with the cam member by means of a spring 63 mounted upon a rod 64 pivoted at its forward end to said lever 50 and at its opposite end is adapted to bear against the inner end of an adjustable stop 65 mounted upon the bracket 54.

In operating this device the shaft 13 is rotated and the different operative elements connected with said shaft are so arranged and timed as to perform in a regular sequence. The cam finger 55 is held in position by the lower cam surface 59 to move the shaft 40 and the shover finger 30 away from the chuck but in position to block the lower end of magazine 26. When said cam finger is engaged by the shoulder 60 it acts to move the shaft 40 and shover 30 so as to allow a tooth to drop down. The parts are in position, as the feeding is initiated with the finger 30 on the feeding mechanism in its outward position, with the guide flange 30' projecting through the opening 52 and a tooth is dropped by gravity into position between the arms 31 and resting upon the wall 29 of the chamber 27. As the finger is later moved forwardly the tooth 12 is moved between the inwardly inclined faces of the arms 31 and said arms guide the said tooth accurately into the forward opening in the chuck 8. The said arms are allowed to spread apart as the finger advances against the tension of the springs 34 in the post 32, as previously noted.

The finger 30 is swung into position in front of the chuck through the tension of the spring 21, seen in Fig. 2. As the shaft 13 is rotated the finger 55 on the lever 50 will be on the upper crest of the cam 57, the effect of this being to move the shaft 40 and the finger 30 into the position just described.

As the shaft is rotated further in the direction shown by the arrow the finger 55 will drop down the shoulder 61 under the action of the spring 63 exerting a pull upon the shaft 40 and the finger, throwing the tooth into the recess in the end of the chuck. The continued rotation of the shaft 13 will bring the end of the cam finger 55 against the shoulder 62 and move it outward and tend to throw the finger 30 away from the tooth 12 which will then be held within said recess by the effect of the electromagnet 11. The movement of the finger 30 slightly to the rear in this manner allows the feeding block to swing laterally out of the way as the chuck is advanced toward the work.

The chuck is advanced and the arm swung laterally when the roller 17 on the lower side of the mandrel 5 reaches the proper position in the cam slot 16. The mandrel will be moved forward under the action of the rotating shaft and as it is moved forward the inclined forward end of the cam block 23 will bear against the roller 22 on the lower side of the arm 19, moving said arm laterally and throwing the feeding block out of the way from in front of the chuck. The continued movement of the mandrel will move the tooth 12 against the work and as the welding operation takes place the spring 9 bearing against the rearward side of the chuck will maintain a continued pressure upon the tooth even when a portion of the tooth is melted in the welding operation. The current passing to the chuck and the tooth is understood as coming from the conductor 66, seen at the forward side of Fig. 2.

The continued rotation of the shaft 13 will withdraw the mandrel 5 from its advanced position and as it moves back the arm 19 and the feeding mechanism thereon will be automatically swung back into position for feeding teeth into the chuck 8, and the operation will be again repeated.

It will be seen that the device as thus constructed is adapted to operate positively so that there will be no danger of failure during the handling of the machine. The feeding mechanism is moved resiliently into position for feeding the teeth to the chuck and the tooth is moved into position in the chuck after which the feeding finger is withdrawn and the feeding mechanism moved out of the way so that the chuck may advance for the welding operation. This construction and arrangement of the parts forms the important feature of my invention.

What I claim as new and desire to protect by Letters Patent is:

1. A feeder for welding devices comprising a horizontally movable chuck having a tooth-receiving recess therein, means to advance said chuck, a swinging arm adjacent said chuck, means tending to hold said arm in feeding position forwardly of said chuck, means to swing said arm away from said chuck, and means on said arm to feed teeth to the recess in said chuck.

2. A feeder for welding devices comprising a chuck having a tooth-receiving recess therein, means to advance said chuck, a swinging arm adjacent said chuck, and means on said arm to feed teeth to the recess in said chuck, said means including a shaft slidable on said arm and means to move said shaft.

3. A feeding device for welding machines including a mandrel, a chuck having a tooth-receiving recess therein on said mandrel, means to move said mandrel and chuck, a swinging arm, a tooth receiving block on said arm, means to swing said arm to position said block adjacent said chuck and means to move teeth from said block into the recess in said chuck.

4. A feeding device for welding machines including a mandrel, a chuck having a tooth-receiving recess therein on said mandrel, means to move said mandrel and chuck, a swinging arm, a tooth-receiving block on said arm, means to swing said arm to position said block adjacent said chuck and means mounted on said arm to move teeth from said block into the recess in said chuck.

5. A feeding device for welding machines including a mandrel, a chuck having a tooth-receiving recess therein on said mandrel, means to move said mandrel and chuck, a swinging arm, a tooth-receiving block on said arm, means to swing said arm to position said block adjacent said chuck and means including a finger operable on said arm to move teeth from said block into the recess in said chuck.

6. In a device for feeding metal objects to a welding terminal, a swinging arm, a block thereon having connection with a magazine for said objects, a chamber in said block to receive objects from said magazine, guide arms to resiliently engage said objects, a finger movable in said chamber to force said objects past said arms and means to move said finger.

7. In a device for feeding metal teeth to a welding terminal, a forwardly slidable chuck having a tooth receiving recess, a swinging arm, a block thereon having a chamber therein to receive teeth for said chuck, means on said arm to move teeth from said chamber to said recess, and means to guide said teeth in their movement.

8. In a device for feeding metal teeth to a welding terminal, a forwardly slidable chuck having a tooth receiving recess, a swinging arm, a block thereon having a chamber therein to receive teeth for said chuck, means on said arm to move teeth from said chamber to said recess, and means to guide said teeth in their movement, said means comprising a pair of spring pressed arms mounted at the sides of said chamber.

9. In a device for feeding metal teeth to a welding terminal, a forwardly slidable chuck having a tooth receiving recess, a swinging arm, a block thereon having a chamber therein to receive teeth for said chuck, means tending to hold said swinging arm forwardly to position said block adjacent said chuck, means on said arm to move teeth from said chamber to said recess, and means to guide said teeth in their movement.

10. In a device for feeding metal teeth to a welding terminal, a forwardly slidable chuck having a tooth receiving recess, a swinging arm, a block thereon having a chamber therein to receive teeth for said chuck, means to hold said swinging arm resiliently forward to position said block adjacent said chuck, means to move said block away as said chuck is advanced, means on said arm to move teeth from said chamber to said recess, and means to guide said teeth in their movement.

11. In a device of the character described, a horizontally slidable chuck, means on the forward end thereof to receive a cutter tooth, a rotatable power shaft, means thereon to move said chuck, means movable laterally from said chuck to feed teeth to said chuck, and means operable from said shaft, to move said teeth to said chuck from said feeding means.

12. In a device of the character described, a longitudinally slidable chuck, means thereon to receive a cutter tooth, a power shaft, means thereon to move said chuck, means movable laterally from said chuck to feed teeth to said chuck, and means operable from said shaft while said chuck is stationary to move said teeth to said chuck from said feeding means.

13. In a device of the character described, a tooth receiving chuck, means to feed cutter teeth to said chuck, and means to retain said teeth in position in said chuck.

14. In a device of the character described, a tooth receiving chuck, means to feed cutter teeth to said chuck, and electromagnetic means to retain said teeth in position in said chuck.

15. In a device of the character described, a longitudinally slidable chuck having a tooth receiving recess therein, an arm above said chuck adapted to swing laterally from said chuck, means on said arm to feed teeth to said recess, means to move said arm to tooth feeding position, and means normally limiting the movement of said arm in one direction to move said tooth feeding means away from said chuck.

16. In a device of the character described, a longitudinally slidable chuck having a tooth receiving recess therein, an arm above said chuck adapted to swing laterally from said chuck, means on said arm to feed teeth to said recess, means to move said arm to tooth feeding position, and means normally limiting the movement of said arm in one direction to move said tooth feeding means away from said chuck, said limiting means being operative to move said arm when said chuck is moved.

17. In a device of the character described, a longitudinally slidable chuck having a tooth receiving recess therein, an arm above said chuck adapted to swing laterally from said chuck, means on said arm to feed teeth to said recess, means to move said arm to tooth feeding position, and means normally limiting the movement of said arm from tooth feeding position and responsive to the longitudinal movement of said chuck to swing said arm away from said chuck.

18. A device for welding small objects upon a larger body, including a welding terminal, a movable magazine adjacent thereto for said objects, means to present the objects from said magazine to the welding terminal, means on said terminal to retain said objects and means to move said first means and to cause reciprocation of said terminal and move said terminal with one of said objects therein to the work.

19. A feeder for welding devices comprising a horizontally positioned chuck having a tooth retaining recess in the forward end thereof, a swinging arm adjacent said chuck, means on said arm to fit a tooth within said recess, and means to advance said chuck with the tooth therein against the work.

20. A feeder for welding devices comprising a horizontally positioned chuck having a tooth retaining recess in the forward end thereof, a swinging arm adjacent said chuck, means on said arm to fit a tooth within said recess, and means to advance said chuck with the tooth therein against the work, said arm being moved from tooth feeding position by said chuck advancing means.

In testimony whereof I hereunto affix my signature this 30th day of November, A. D. 1928.

SETH EVANS.